United States Patent
von Flotow

(10) Patent No.: US 6,785,635 B2
(45) Date of Patent: *Aug. 31, 2004

(54) APPARATUS AND METHOD FOR PREDICTING FAILURES OF SPINNING DISKS IN TURBO-MACHINERY

(75) Inventor: Andreas von Flotow, Hood River, OR (US)

(73) Assignee: Hood Technology Corporation, Hood River, OR (US)

(*) Notice: Subject to any disclaimer, the term of this patent is extended or adjusted under 35 U.S.C. 154(b) by 19 days.

This patent is subject to a terminal disclaimer.

(21) Appl. No.: 10/280,320

(22) Filed: Oct. 25, 2002

(65) Prior Publication Data

US 2003/0060986 A1 Mar. 27, 2003

Related U.S. Application Data

(63) Continuation-in-part of application No. 09/624,441, filed on Jul. 24, 2000, now Pat. No. 6,594,619.
(60) Provisional application No. 60/146,672, filed on Aug. 2, 1999.

(51) Int. Cl.$^7$ .............................................. G06F 15/00
(52) U.S. Cl. ...................... 702/184; 702/184; 702/150; 702/43; 702/33; 310/40 R; 73/660; 73/658; 250/233; 250/224
(58) Field of Search ............................. 702/33–36, 43, 702/94, 97, 127; 310/40 R, 40.5; 416/229 A, 223; 250/233, 224; 73/660, 658; 74/10.1, 20

(56) References Cited

U.S. PATENT DOCUMENTS

4,573,358 A * 3/1986 Luongo ....................... 73/660
6,594,619 B1 * 7/2003 von Flotow ................ 702/184

OTHER PUBLICATIONS

Bill Walden, 'True RMS Measuring versus Average Absolute Measuring Current and Voltage Transducers where Harmonic Content Exists', Nov. 1998, pp. 1–5.*

Key Curriculum Press, 'Square Wave in Detail', Jan. 1996, pp. 1–3.*

* cited by examiner

Primary Examiner—Marc S. Hoff
Assistant Examiner—Elias Desta
(74) Attorney, Agent, or Firm—Bell, Boyd & Lloyd LLC

(57) ABSTRACT

An apparatus is described for detecting the early signs of cycle-induced fatigue and thereby predicting failure of the rotating disk in turbo-machinery. It identifies change in shape of the entire disk in radial, tangential and axial directions. It examines these deformations as a function of rotational velocity and compares them to a data base of deformations due to cracks in the rotor. Blade-tip measurements are processed through specialized algorithms to detect such asymmetry during operation, providing a real-time, non-destructive method of prediction. The sensors can be housed within the machinery case, and are capable of operating in harsh environments while maintaining adequate stand-off distance, making the entire apparatus robust enough for conditions in high-speed turbo-machinery.

14 Claims, 5 Drawing Sheets

A rotor exhibiting axial displacement

A rotor exhibiting radial displacement (exaggerated)

A rotor exhibiting tangential displacement (exaggerated)

APPARATUS AND METHOD FOR PREDICTING FAILURES OF SPINNING DISKS IN TURBO-MACHINERY

The present application is a continuation-in-part of U.S. patent application Ser. No. 09/624,441, filed Jul. 24, 2000, now U.S. Pat. No. 6,594,619 which is directly related to U.S. Provisional Patent Application No. 60/146,672, filed Aug. 2, 1999, the entire contents of each are hereby incorporated by reference and relied upon.

BACKGROUND OF THE INVENTION

1. Field of the Invention

The present invention is for an apparatus and a method for anticipating disk burst failures in turbo-machinery rotors. The apparatus comprises:

- at least one blade-tip sensor for sensing blade passage and making measurements of radial, tangential (circumferential) and axial blade-tip deflection;
- a computer for compilation and analysis of data from the sensors; and
- optional additional sensors

2. Description of the Related Art

If they are not replaced, turbo-machinery disks (spinning hubs and blades) eventually burst due to spin-induced stresses and fatigue. The failure pattern varies, depending upon the specific crack and disk in which it grows. Moreover, such deformation is not symmetric, but rather is biased due to asymmetric crack propagation in the disk.

Historic methods to predict disk failure require disassembly of the turbo-machinery for standard materials analysis, including x-ray crystallography, eddy current inspection, sonograms, and other diagnostic techniques. The predictive value relies on estimating when micro-cracks have formed and then searching for confirmation. Due to wide variations in operating conditions and in the fatigue life of turbo-machinery components, historic methods require frequent inspection intervals to maintain safe operation.

A recent experimental technique referenced in U.S. Pat. No. 6,098,022 (Sonnichsen) employed in spin pit tests relies on changes in the imbalance when a turbo-machinery disk is spun suspended on a quill shaft. The reasoning behind this technique is that crack propagation will progressively shift the imbalance in the rotating disk. This technique found application in controlled experiments in spin pits, but may be difficult to apply in engine operation, where many effects cause shifts in imbalance.

Disk deformation can be monitored at the blade tips at the perimeter of the rotor. For example, in a rotor with N blades, a blade-tip sensing system provides N measures of rotor radius for every engine revolution. The trend of such measurements over many operational cycles can reveal a local bulge or bulges indicative of impending disk burst.

Tangential displacement of rotor blades can also be monitored at the blade tips. For example, in a rotor with N equally spaced blades spinning at P revolutions per second, equally spaced blades should arrive every P/N second. Blade arrival times that vary from P/N indicate tangential displacement.

Axial displacement of rotor blades can also be monitored at the blade tips. For example, in a rotor with radius R, spinning a speed P, blade-tip speed is $2\pi RP$. If blade-tips form a 45 degree angle with the spin axis of the engine, an axial displacement of distance h results in a delay in blade-tip time of arrival of $h/(2\pi RP)$. If the rotor is distorted axially into a saddle or 'potato chip' shape, the sensor will register a varying sine wave in time-of-arrival that corresponds to the axial deflection.

The disk deforms elastically as the disk is spun to high rpm and contracts again when the disk is slowed. Such "elastic stretch" can create a relatively large signal, roughly equal for each blade on the spinning disk. The detection system must discount this form of deformation. One way to do so is to compare disk shape during each operating cycle at the same rpm, so as to detect only variations due to causes other than elastic stretch. Another way is to normalize all rotor deformations by a predictive model of how these deformations are expected to vary with rotor speed; the simplest such prediction is that elastic deformation varies with the square of rotor speed.

An additional complication is the variation due to temperature, which can also add significant deformation. This deformation is typically axisymmetric and can be disregarded by pattern recognition techniques.

It is an object of the present application to present an apparatus and method for anticipating disk burst failures in turbo-machinery in which one or more case-mounted sensors observes radial, tangential and axial displacement of each blade tip as a function of rotational velocity and a computer to search the data for deformation trends that indicate crack development and propagation.

SUMMARY OF THE INVENTION

The present invention is for an apparatus and a method for anticipating disk burst failures in turbo-machinery rotors. The apparatus comprises at least one blade-tip sensor for sensing blade passage, making measurements of blade-tip time-of-arrival and clearance from the sensor to a blade-tip and a computer for compilation and analysis of data from the sensors.

The method for crack identification and disk burst prediction compares data from measurements made by sensors to a database of known deformations due to disk cracks. A crack in the hub produces asymmetric radial, tangential and axial deflections of the blade tips that increase with the rotational velocity at the blade-tips. This is indicative of deformation of the disc. This invention looks for such deformations. This invention also analyzes the measurements in a computer and compares them with a database of deformations that indicate crack development.

In preferred embodiments of the apparatus, the analysis compensates for variation due to symmetric inertial and temperature effects. In yet other preferred embodiments of the apparatus, the blade-tip sensor is case mounted.

DETAILED DESCRIPTION OF THE INVENTION

Figure 1:
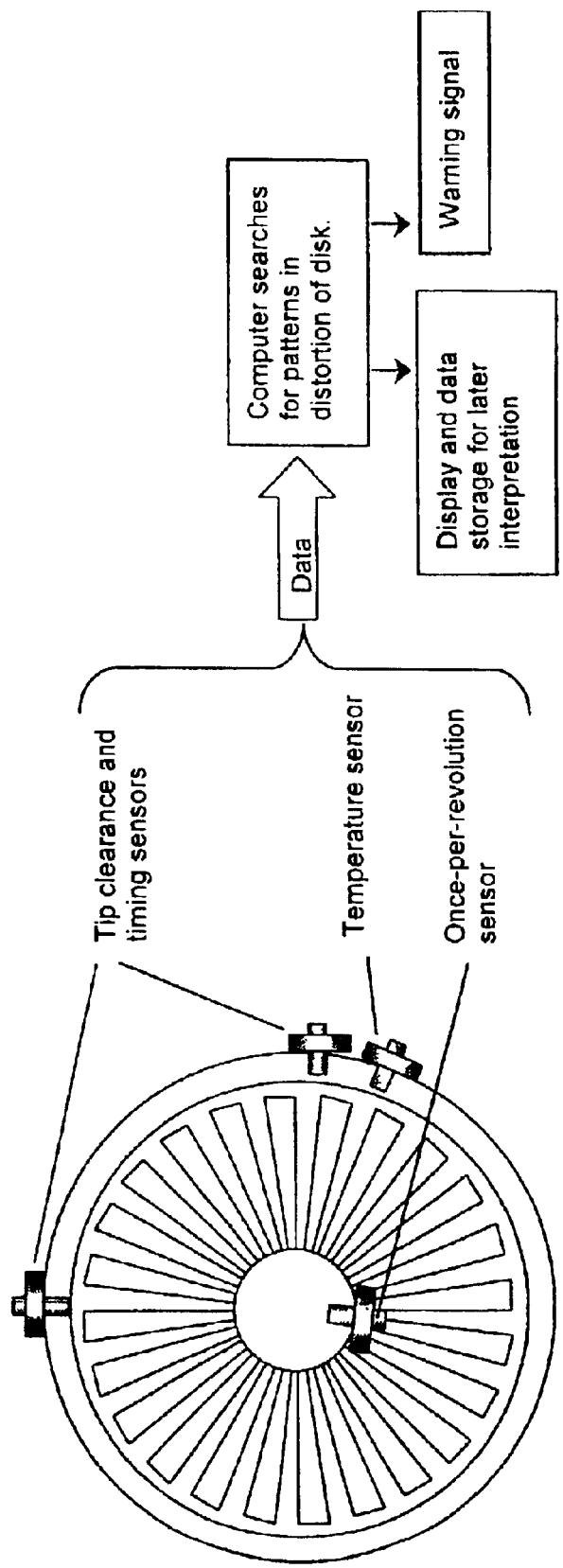
FIG. 1 illustrates the apparatus employed by the present invention: a blade-tip sensor and a computer for detecting patterns in the blade tip measurements which indicate the presence of a disc crack. Also shown in FIG. 1 are optional additional sensors; a hub once-per-revolution sensor, an additional blade-tip sensor, and a temperature sensor.

FIG. 1 illustrates the apparatus upon which the present invention is based: Crack formation in the disk leads to non-symmetric radial, tangential and axial deformation of a turbo-machinery disk. Changes in the shape of the disk indicate an impending disk burst. Each crack causes a specific deformation of the disk, from which the crack can be identified.

Components of the apparatus of the present invention include one or more sensors to detect blade passage, an optional sensor creating a one-per-revolution signal to track angular orientation of the disk, and an optional temperature sensor. A computational algorithm is used to reduce the data in order to search for asymmetric patterns in disk deformation. Symmetric rotor deformation due to inertia and temperature are disregarded in order to focus the search upon rotor deformation due to crack propagation. Results of the sensing and algorithmic system are reported in the form of warning signals, other information for human interpretation, and/or data for both real-time and historic computational analysis.

Figure 2:
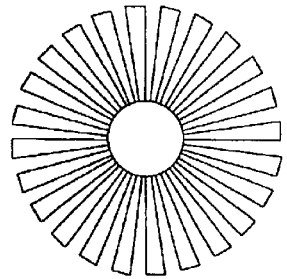
FIG. 2 illustrates a particular deformation pattern calculated for a 25-bladed fan for a particular crack in the disk. Note that this deformation pattern shows deflections of every blade, in each of the three directions.
Figure 2:
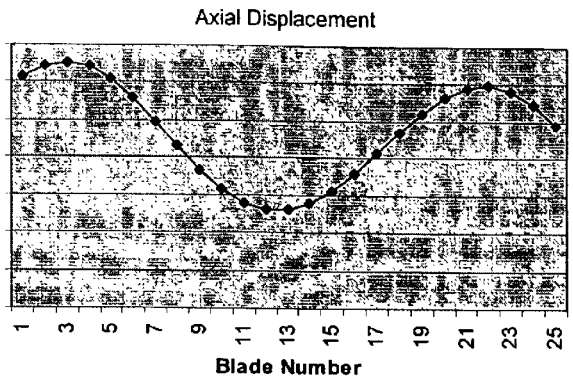
Figure 2:
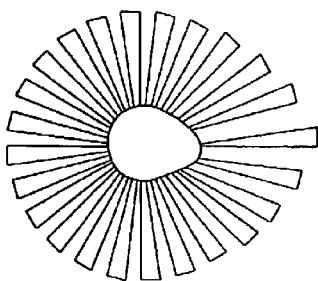
Figure 2:
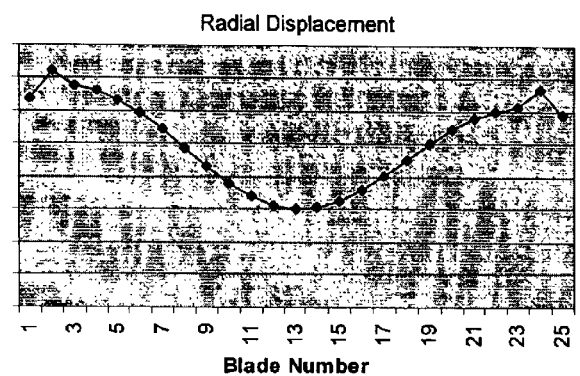
Figure 2:
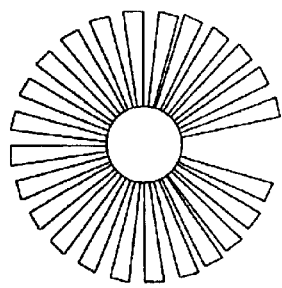
Figure 2:
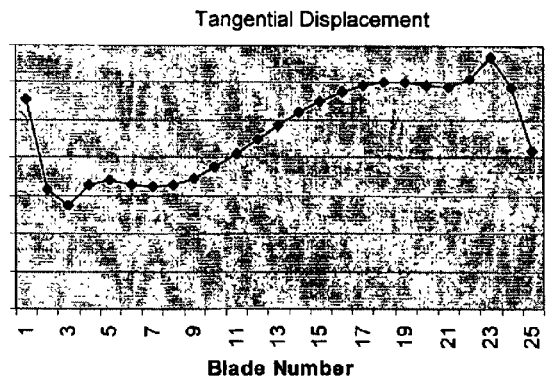

FIG. 2 provides an example of a computed deformation pattern due to a crack in a 25-blade fan. The data for three directions of displacement of a reference point on each blade tip are presented.

Figure 3:
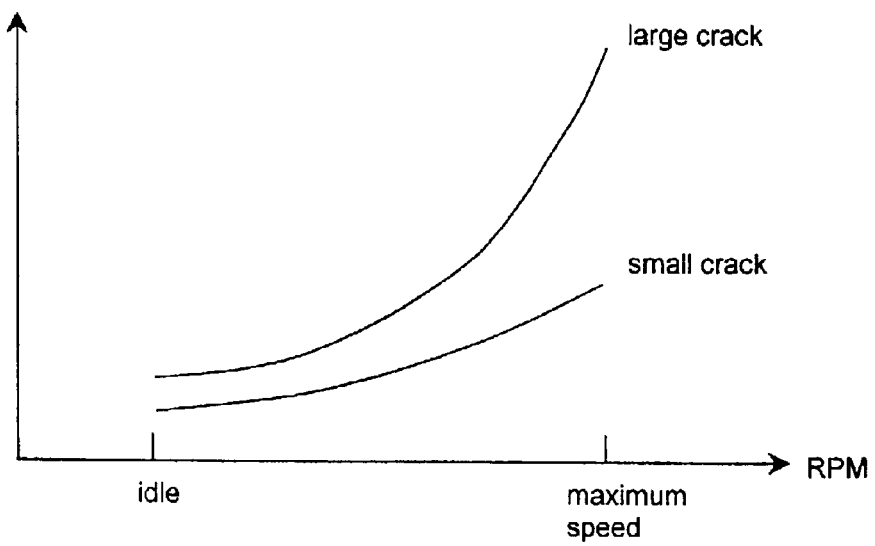
FIG. 3 provides an illustration of how the amplitude of the deformation pattern detailed in FIG. 2 can be expected to grow as the rpm increases and as the crack grows.

FIG. 3 presents the expected variation of the amplitude of the deformation signature due to the crack. The amplitude of this deformation is expected to grow when the rotor rpm increases and as the crack grows.

Figure 4:
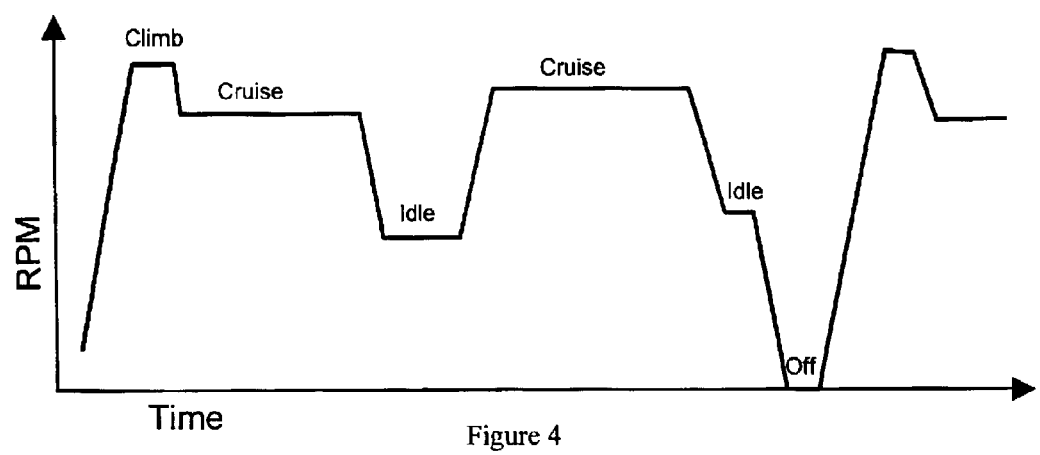
FIG. 4 is a generic description of how rpm might vary in any given time period, as that gas turbine engine operates in an aircraft.

FIG. 4 provides an illustration of the cycles which turbo-machinery experiences in practice: engine speed during flight operations. A jet aircraft engine in normal commercial service undergoes few variations in rpm during each flight.

Figure 5:
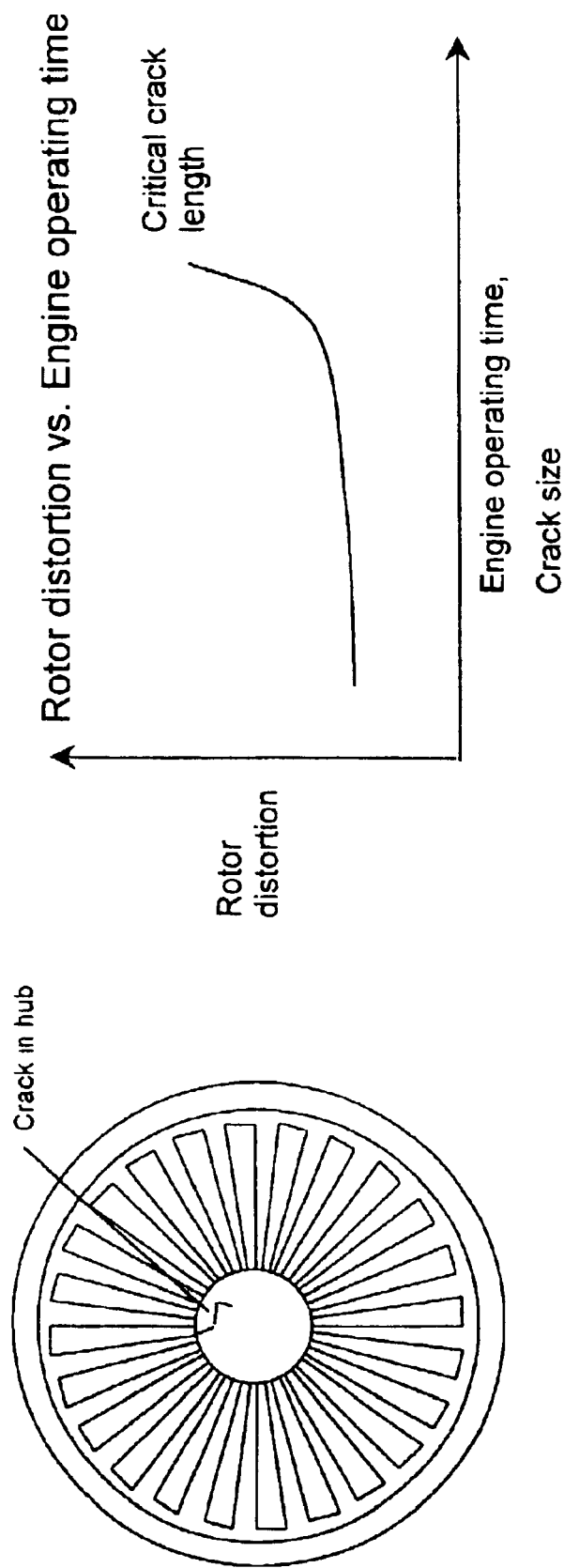
FIG. 5 shows the expected trend of the crack deformation signature as the engine accumulates operating time.

FIG. 5 shows the expected amplitude of crack-induced rotor distortion as engine operating time increases. Initially, the distortion is expected to grow slowly as the crack grows slowly. When the crack becomes larger, it also typically grows faster until it reaches a critical size and the rotor bursts.

An out-of-round disk pattern may occur for reasons that do not lead to disk burst. Examples include imbalance shift, bearing wear and spool bow. Such factors create once-perrev sinusoidal variations in the measurements. The algorithm governing this apparatus removes such phenomena from the prediction of burst failure. For each engine revolution, a set of measurements of blade-tip clearance is created. The algorithm is designed to develop a "bestfit" one-per-rev sinusoid and to subtract it from the measurement data. The remaining changes in rotor deformation can indicate incipient disk burst.

A resolution in measurement of tip clearance and circumferential deflection of about 0.001 inch (0.025 mm) is adequate for typical rotors used in manned aircraft propulsion systems. Inertial (rpm-induced) elastic growth of the blades may be as large as 0.080 inch (2 mm), and thermal expansion may account for as much as 0.020 inch (0.5 mm) for large disks. Sensor stand-off distance must thus be about 0.2 inch (5 mm), maybe more if disk run-out is significant. Capacitance and eddy current sensors are capable of operating with such clearances and at the necessary resolution, though other sensors may also be used.

The sensing and data reduction system can operate with one sensor, or with multiple sensors simultaneously.

The features of the present apparatus to predict disk failure in turbo-machinery are:

(1) A means of tip-sensing to quantify disk deformation as a predictor of incipient crack growth leading to disk burst.

The apparatus described above relies on a novel means of detecting crack creation and growth in turbo-machinery. Unlike traditional techniques, it does not require disassembly of the engine, but rather is designed to operate under engine operating conditions while the disk is in motion. Unlike a laboratory technique, it is intended to perform while in turbo-machinery under operating conditions and to provide real-time prediction of disk health or failure. It employs a novel conception of how crack growth contributes to asymmetric growth of the disk and of how to detect and analyze that growth.

(2) An algorithm to reduce measurement data in order to isolate deformation in disk shape due to crack development.

The algorithmic analysis of data relies on a novel combination of straightforward techniques to reduce the sensor measurements to detect crack growth. The algorithms developed for this apparatus adjust for variations in rpm and its inertial effect on disk deformation. They also cancel out temperature effects on blade growth. And finally, they use a "best-fit" once-per-rev sinusoid to account for such effects as imbalance shift, bearing wear and spool bow. Elimination of such inertial, temperature, and sinusoidal effects provides the opportunity to focus on the results of micro-cracks.

While the invention has been described in connection with what is presently considered to be the most practical and preferred embodiments, it is to be understood that the invention is not limited to the disclosed embodiments, but on the contrary is intended to cover various modifications and equivalent arrangements included within the spirit and scope of the appended claims.

Thus, it is to be understood that variations in the present invention can be made without departing from the novel aspects of this invention as defined in the claims. All patents and articles cited herein are hereby incorporated by reference in their entirety and relied upon.

What is claimed is:

1. An apparatus for anticipating disk burst failures in turbo-machinery blades, comprising at least one blade-tip sensor for sensing blade passage and making measurements of the radial, circumferential and axial positions of the blade tips on the spinning rotor and a computer for compilation and analysis of data from sensor.

2. The apparatus of claim 1, wherein said analysis compensates for inertial and temperature effects by subtracting the average displacement of all the blades from the actual displacemeht of each blade.

3. The apparatus of claim 1, wherein said analysis compensates for unbalance effects by subtracting from the actual displacement of the blades, that displacement of which best models a rigid-body unbalance of the entire rotor.

4. The apparatus of claim 1, wherein said analysis compensates for temperature and inertial effects by searching for asymmetric patterns of blade deformation.

5. The apparatus of claim 1, wherein said blade-tip sensor is case mounted.

6. The apparatus of claim 1, wherein specific rotor cracks are identified by comparing the measured blade-tip deflections with a data base of blade-tip deflections known to be associated with specific rotor cracks.

7. The apparatus of claim 1, where the blade tip sensor is augmented by a sensor indicating hub rotational angle.

8. A method for anticipating disk burst failures in turbo-machinery blades, comprising at least one blade-tip sensor for sensing blade passage and making measurements of the radial, circumferential and axial positions of the blade tips on the spinning rotor and a computer for compilation and analysis of data from the sensor.

9. The method of claim 8, wherein said analysis compensates for inertial and temperature effects by subtracting the average displacement of all the blades from the actual displacement of each blade.

10. The method of claim 8, wherein said analysis compensates for unbalance effects by subtracting from the actual displacement of the blades, that displacement of which best models a rigid-body unbalance of the entire rotor.

11. The method of claim 8, wherein said analysis compensates for temperature and inertial effects by searching for asymmetric patterns of blade deformation.

12. The method of claim 8, wherein said blade-tip sensor is case mounted.

13. The method of claim 8, wherein specific rotor cracks are identified by comparing the measured blade-tip deflections with a data base of blade-tip deflections known to be associated with specific rotor cracks.

14. The method of claim 8, where the blade tip sensor is augmented by a sensor indicating hub rotational angle.

* * * * *